(No Model.) 2 Sheets—Sheet 2.
C. A. I. BABENDREIER.
WATER FEEDER FOR BOILERS.
No. 414,004. Patented Oct. 29, 1889.
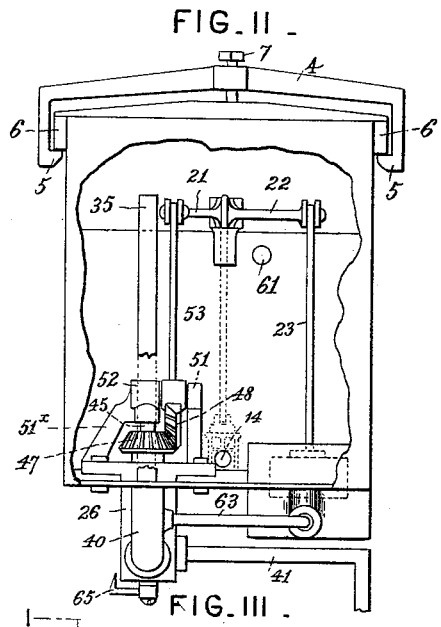
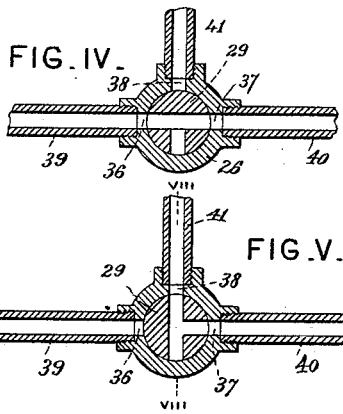
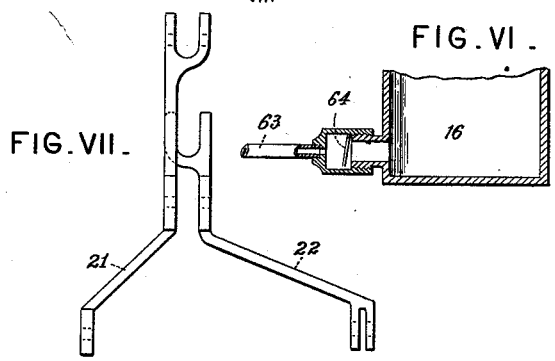
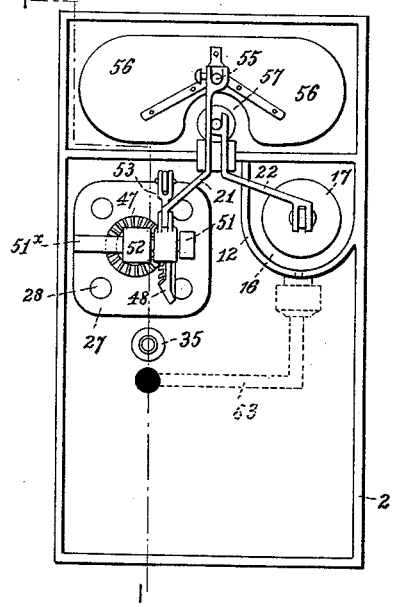
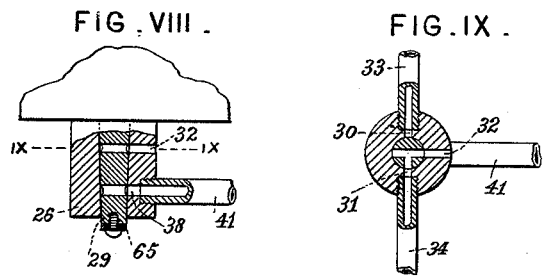
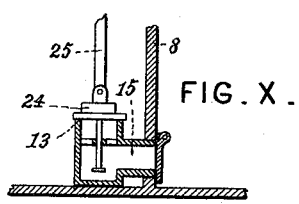
Attest
Geo. T. Smallwood.
F. A. Hopkins
Inventor
Charles A. I. Babendreier
by Knight Bros.
attys

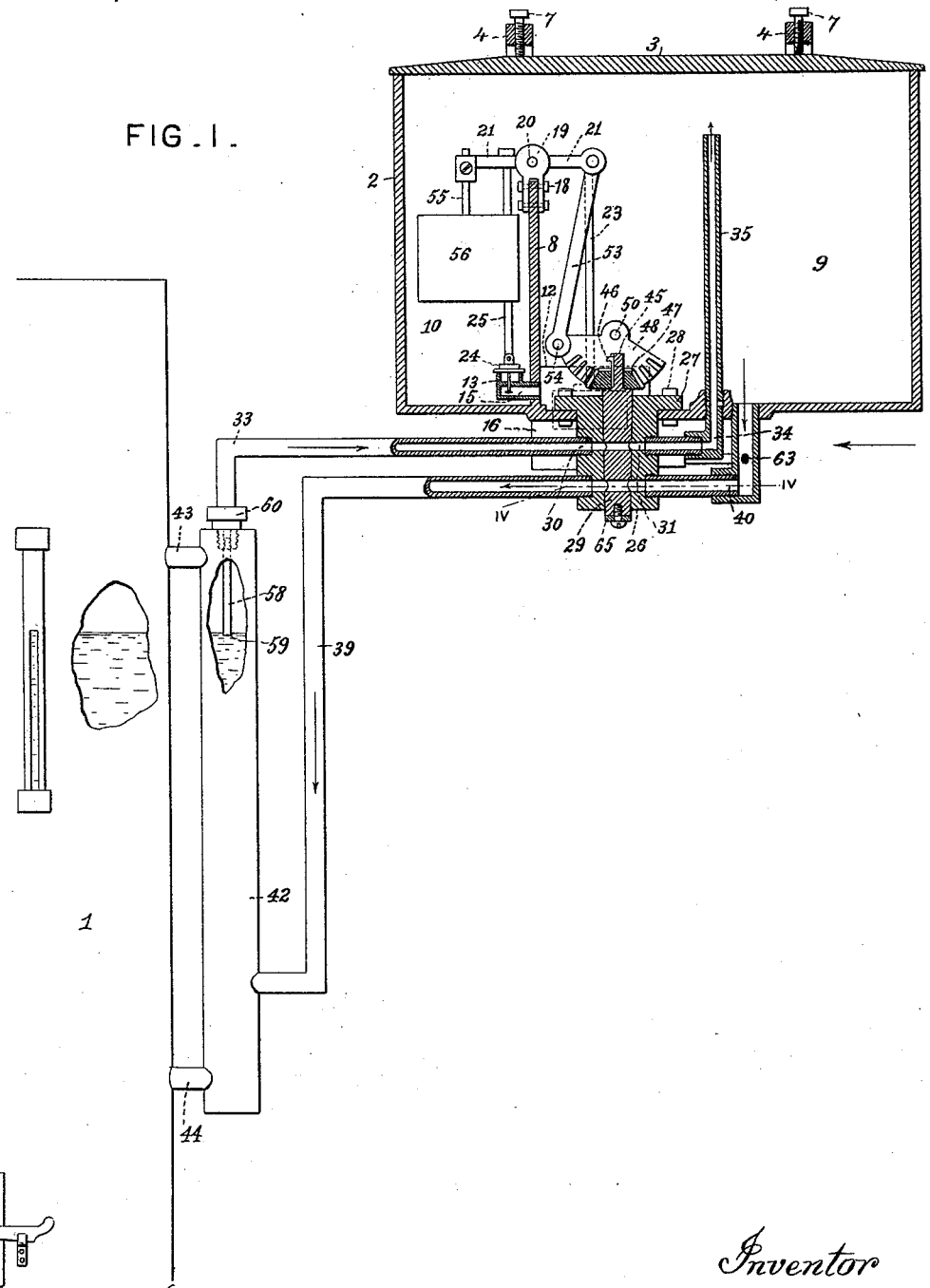

UNITED STATES PATENT OFFICE.

CHARLES ALBERT IRVING BABENDREIER, OF BALTIMORE, MARYLAND, ASSIGNOR OF ONE-HALF TO HARRY FISHER, OF SAME PLACE.

WATER-FEEDER FOR BOILERS.

SPECIFICATION forming part of Letters Patent No. 414,004, dated October 29, 1889.

Application filed February 7, 1889. Serial No. 299,013. (No model.)

*To all whom it may concern:*

Be it known that I, CHARLES ALBERT IRVING BABENDREIER, a citizen of the United States, residing at Baltimore, in the State of Maryland, have invented certain new and useful Improvements in Automatic Water-Feeders for Steam-Boilers, of which the following is a full, clear, and exact specification.

My invention relates to devices for supplying or injecting water into steam-boilers to take the place of that which has been converted into steam and utilized; and it has for its object to provide a device of this character that will be automatic in its operation, requiring no care or attention on the part of the engineer or attendant, will be effective and certain of action and simple in construction, and will retain the level of the water in the boiler at a predetermined point without variation.

The invention consists in the novel means for accomplishing the above-named object, which will now be described with reference to the accompanying drawings, which form an important part of this application, and then more particularly pointed out in the claims hereto annexed.

In the said drawings, Figure I is a view showing my improvements in vertical longitudinal section, taken on line I I, Fig. III, applied to a boiler, a portion only of the latter being shown. Fig. II is an end view of the trap hereinafter referred to, looking in the direction of the arrow, Fig. I, the end portion being broken away, showing the interior mechanism. Fig. III is a plan view of said trap, the cover being removed. Fig. IV is an enlarged detail section of the compound cock, taken on the line IV IV, Fig. 1, showing its ports forming communication between the said trap and the boiler. Fig. V is a view of the same, but the plug being turned to place the hydrant or water-supply pipe and trap in communication. Fig. VI is an enlarged detail section taken on the line VI VI, Fig. II. Fig. VII is an enlarged detail view of the float-levers hereinafter described, showing them in their proper positions relatively to each other. Fig. VIII is an enlarged detail view of the compound cock in vertical section, taken on line VIII VIII, Fig. V, showing it in position to establish communication between the hydrant and trap, and also between the upper part of the trap and a vent leading to the atmospheric air, as hereinafter more fully described. Fig. IX is a sectional view of the cock, taken on the line IX IX, Fig. VIII, showing communication between the air-vent and trap; and Fig. X is a modification of a detail.

1 is the steam-boiler, and 2 is the trap or tank, having preferably a removable cover 3, which is held in place by any suitable means—such as the clamps 4, having lugs 5, engaging under rims or flanges 6, near the upper edge of the trap, and screws 7, adapted to produce pressure upon the cover. This trap or tank is the receptacle for the feed-water before the latter is forced into the boiler, and it is divided at one end by means of a partition or wall 8, which extends upward to within a short distance of the top of the trap and forms two compartments 9 10. The compartment 9 contains a low annular wall or partition 12, and in the compartment 10, near the partition 8, is located a valve-seat 13, which communicates with the compartment 9 through an orifice 14 by means of a short horizontal pipe 15. The surface of this valve-seat, however, is situated above or at least on a level with the top of the partition or wall 12, in order that the water will flow over the partition 12 before it will rise in the compartment 10, for a purpose presently to be described. Within this annular wall or partition 12, in the bottom of the tank or trap 2, is a well or pit 16, and in this well is situated a float 17. On the top of the partition 8 is secured, by means of rivets 18, a box or bearing 19, in which, on the pintle 20, are mounted two levers 21 22, whose ends are bifurcated or otherwise formed to adapt them to be secured or pivoted to connecting-rods. The lever 22 is bent at an angle, so as to bring its one end over the float 17, while its other end will be directly over the valve-seat 13, and it is connected at the aforesaid end to the said float by means of a link or connecting-rod 23, while at its opposite end it is attached to a valve 24, resting upon the seat 13 and closing communication between the two compartments by means of a rod or link 25.

Secured in the bottom of the trap 2, on the outside of the annular wall or partition 12, is a valve-housing 26, having a flange 27, resting upon and secured to the bottom of the trap by means of bolts 28, as shown. Situated in this housing is a three-way compound valve or cock 29, having two series of three-way ports arranged one above the other, as shown in Fig. I, and the housing is likewise provided with corresponding ports. The upper ports 30, 31, and 32 (see Figs. I, VIII, and IX) of the housing communicate, respectively, with the boiler by means of the pipe 33, with the upper portion of the tank or trap 2 by means of the elbow 34 and stand pipe 35, (which, as shown, extends above the partition 8, and hence above the high-water line,) and with the external atmosphere, while the lower ports 36, 37, and 38 of the housing communicate, respectively, with the boiler by means of the pipe 39, with the tank by means of the elbow 40, and with the hydrant (not shown) or the water-supply by means of the pipe 41, and the compound cock is adapted to place any two of these ports as well as the upper ones in communication through its ports.

Instead of connecting the pipes 33 39 directly to the boiler, I prefer to connect them the one 33 in the head or upper end and the one 39 near the bottom of a barrel or tank 42, which is itself connected at top above the water-line and at bottom below the water-line to the boiler by means of short pipes 43 44, respectively. Thus it will be seen that the boiler is connected above its water-line with the trap above the water-line of the latter by means of one duct and below the water-line with the bottom of the trap by means of a separate duct; or, in other words, the spaces above and below the water-lines in the trap and boiler are respectively connected by means of separate ducts, which may be simultaneously opened or closed by a quarter-revolution of the compound cock 29.

On the upper end of the cock 29 is an axial tenon 45, on which is secured, by means of a key 46, a bevel-pinion 47, with which latter engages a circular beveled segment-rack 48. This rack 48 is journaled upon a pintle 50, extending between the upper ends of two standards or brackets 51 51$^\times$, planted in or made integral with the flange 27, and the bracket 51$^\times$ carries a box 52, in which is journaled the upper end of the tenon 45, whereby the plug is held rigidly in place. The inner end of the lever 21 is connected to one side of this segment-rack by means of a rod or link 53 and a pivot-pin 54, made integral with the corner of the rack, while the outer end of this lever has suspended from it, by means of a rod 55, a heavy float 56, which covers approximately the whole superficial area of the compartment 10, and is rounded out or cut away at its mid-length 57, in order that it may not interfere with the operation of the valve 24 and its stem or rod 23. This float, as well as the one 17, may be of any of the well-known kinds, and the rods may be secured to them in any suitable and desirable manner.

The pipe 33, which connects the space above the water-line of the trap 2 with the boiler above its water-line, is preferably secured axially in the upper end of the barrel or tank 42, and has an attenuated extension 58 projecting down into the barrel. The length of this extension will determine or regulate the height of the water in the boiler, for it is plainly evident that so long as its lower end or mouth 59 is sealed by the water in the barrel (which level is of course the same as the level in the boiler) the water gravitating from the tank or trap will stop for the want of pressure above it, the steam-pressure through the pipe 35 being checked by the rise of the water in the barrel above the pipe-mouth 59. Therefore the normal (and in fact permanent) water-level may be fixed at any height, according to the location of the mouth 59 of the extension, and if it should be desired to change the water-level it is only necessary to remove the plug 60 from the head of the barrel and replace the extension by one of different length, the extension being screwed into the lower end of the plug 60, as shown.

When there is no water in the well 16 or the compartment 10, the floats 17 56 will of course descend, and in so doing the former 17 will operate the segment 48 to turn the cock one-fourth the way around in the position shown in Fig. V, in which position all communication via the pipes 33 39 with the boiler or barrel 42 is entirely cut off, while the upper series of ports in the cock-plug 29 place the air-port 31 and port 32, leading to the stand-pipe 35, in communication, as shown in Fig. IX, and the lower series place the hydrant-supply pipe 41 and pipe 40, leading to the bottom of the trap, in communication. Thus it will be seen that the water from the hydrant will flow into the trap 2, entering first the compartment 9 on the opposite side of the partition 12 to the well or pit 16, and will rise until it overflows said partition or wall, and, filling the well, will cause the float 17 to rise and thereby force the valve 24 to its seat with considerable pressure. None of the water, however, will enter the compartment 10 before the valve 24 is closed, and thereby lighten or raise the float 56, for the reason that the valve-seat 13 is on a higher level than the top of the partition 12, so that the water will fill the well and close the valve 10 before it rises above the said valve-seat; or to further insure against the water entering the compartment 10 via the valve 24 the port 14 may be provided with a butterfly-valve 62, as shown in Fig. X. The valve 24 being now hermetically closed, the water will continue to rise in the compartment 9 without running into the compartment 10 at all until its level reaches the aperture 61 in the partition 8, whereupon it runs through and begins to fill the compartment 10 and begins to raise the float 56, and consequently turns the valve 29, so as to cut off the flow of water from the hydrant-pipe 41 and also the air-port 32; but it will be observed that if the rise of the water in the compartment 10 stopped when the supply from the pipe 41 was cut off the float would only be buoyed up sufficiently far to barely close the air-port 32 and supply-port 38, as just mentioned, while communication between the boiler and the trap *via* the pipes 33 39 34 40 would still be closed. Therefore the water is allowed to enter the compartment 10 at a less rate than it enters the compartment 9, so that although the level of the water has reached the aperture 61 it will nevertheless continue to rise above it, and may even overflow the partition 8 before sufficient has run through the aperture 61 to raise the float 56 all the way, so that after the water reaches the top of the partition 8 in the compartment 9 there will still be enough above the aperture 61 to run into the compartment 10 and buoy the float sufficiently high to turn the cock all the way—that is, with its ports communicating with the pipes 33 39 34 40, respectively. Communication with the boiler now being opened, the steam will enter the trap through the stand-pipe 35, and the hot water from the boiler will enter *via* the pipe 40, thus equalizing the pressure in the trap and boiler and allowing the water from the trap to flow by virtue of gravity down the pipe 39 and thence into the barrel 42 and boiler until it rises to such a level as to cover the mouth 59 of the extension 58, thus stopping off the pressure of steam at the top of the water in the trap 2, and consequently preventing a further quantity of water from flowing down the pipe 39 into the barrel.

The water in exhausting from the trap 2 will entirely run out of the compartment 9 before any leaves the compartment 10, the water in the well 16 in said compartment 9 being of course the last to leave the trap, and it exhausts from this well *via* the duct 63, which leads to the pipe 40 and is provided with an outwardly-opening valve 64, which permits the outflow from the well, but prevents backflow from the pipe 40. As the valve 24 is now bearing a great deal of pressure from the water in the compartment 10, it will remain on its seat until the water has nearly left the float 17; but as the water sinks the float will gradually preponderate and suddenly raise the valve 24 from its seat with a jerk, allowing the volume in the compartment 10 to rush out and descend into the boiler, but is prevented from first passing into the well 16 (which would cause the float therein to rise and again close the valve 24) by reason of the partition 12 in the trap and the check-valve 64 in the duct 63. This release of the water in the compartment 10 will cause the float 56 to descend rapidly and suddenly turn the cock 29 back to the position indicated at Figs. V, VIII, and IX, shutting off the connection with the boiler and opening communication with the hydrant and atmosphere.

It will be seen that if the float 56 were allowed to descend gradually with the water in the compartment 9 communication between the boiler and trap would be shut off before the valve had turned far enough to open communication with the hydrant; hence it is essential to have the water in the compartment 10 remain until the compartment 9 is emptied, so that when the water in compartment 10 is once released it cannot again assume a level sufficiently high to prevent the descent of the float 56 even though it does not leave the compartment 9.

The lower end of the plug 29 is provided with a usual indicator 65, to show at all times the position of the ports in the plug.

It will of course be understood that the barrel or tank 42 may be omitted and the two pipes 33 39 connected directly with the boiler without deviating from the spirit of my invention.

Having thus described my invention, the following is what I claim as new therein and desire to secure by Letters Patent:

1. The combination, with the boiler and the trap 2, of a pipe connecting the upper part of said trap with the upper part of the boiler and having a downwardly-projecting end adapted to be sealed by the boiler-water, a pipe connecting the lower part of the trap with the lower part of the boiler, a cock for closing said pipes, and a float in said trap for operating said cock, substantially as set forth.

2. The combination, with the boiler, the trap 2, and the supply-pipe 41, of a housing having ports communicating with the upper part of the boiler and upper part of said trap and ports communicating with the lower part of the boiler and the lower part of the trap and with said water-supply pipe, a plug in said housing having corresponding ports, and a float in said trap for operating said plug, substantially as set forth.

3. The combination, with the boiler and the trap 2, of pipes 33 39, connecting the upper and lower parts of said trap with the upper and lower parts of the boiler, respectively, the extension 58 on said pipe 33 extending below the water-line of the boiler, a water-supply pipe connected to one of said pipes, a cock for shutting off either the water-supply or pipes from the boiler, and a float in said trap for operating said cock, substantially as set forth.

4. The combination, with the boiler and the trap, of pipes connecting the upper and lower parts of said trap with the upper and lower parts of the boiler, respectively, the cock-housing interposed in the length of said pipes, the supply-pipe connected to said housing, a plug in said housing for shutting off either the water-supply or the pipes from the boiler, a partition in said trap forming compartment 10 and having an aperture, a valve guarding said aperture, a float for operating said valve, and a float in said compartment for operating said plug, substantially as set forth.

5. The combination, with the boiler and trap 2, of pipes connecting said trap with the upper and lower portions of the boiler, a water-supply pipe communicating with one of said pipes, a cock for forming communication between either the supply-pipe and trap or the trap and the boiler, a partition in said trap forming compartments 9 10 and having an aperture, a valve guarding said aperture, a float in compartment 9 for operating said valve, and a float in compartment 10 for operating said cock, substantially as set forth.

6. The combination, with the boiler and trap 2, having two compartments 9 10, connected by an aperture, of pipes connecting said compartment 9 with the upper and lower portions of the boiler, a water-supply communicating with one of said pipes, a cock for forming communication between either the supply-pipe and trap or trap and boiler, a valve guarding said aperture, the well or pit in compartment 9, having an outlet, a float in said well connected to said valve for actuating it, and a float in compartment 10 for operating said cock, substantially as set forth.

7. The combination, with the boiler, of the trap 2, having two compartments 9 10, connected by an upper and a lower aperture, a valve guarding said lower aperture, a well or pit in compartment 9, having an outlet, a float in said well connected to said valve for actuating it, pipes connecting compartment 9 with the upper and lower portions of the boiler, a supply-pipe communicating with one of said pipes, a cock for forming communication between either the supply-pipe and trap or trap and boiler, and a float in compartment 10 for operating said cock, substantially as set forth.

8. The combination, with the boiler, of the trap 2, having compartments 9 10, connected by an upper and a lower aperture, a valve guarding said lower aperture, the well 16, having an outlet in compartment 9, a float in said well connected to said valve for actuating it, pipes connecting compartment 9 with the upper and lower portions of the boiler, a partition 12, separating said pipes and valve from said well, a water-supply pipe communicating with one of said pipes, a cock for forming communication between either said supply-pipe and trap or the trap and boiler, and a float in compartment 10 for operating said cock, substantially as set forth.

9. The combination, with the boiler, of the trap 2, having compartments 9 10, connected by an upper and a lower aperture, a valve guarding said lower aperture, the well 16 in compartment 9, a float in said well for actuating said valve, pipes connecting the upper and lower portions of the boiler with said trap, the housing 26, with which said pipes connect, a supply-pipe connected to said housing, the compound plug 29 in said housing, a pipe 63, connecting well 16 with one of the pipes from the boiler, a valve in pipe 63, and a float in compartment 10 for actuating said plug 29, substantially as set forth.

10. The combination, with the boiler, of the trap 2, having compartments 9 10, connected by an upper and lower aperture, a valve guarding said lower aperture, the well 16 in compartment 9, a float in said well, a lever connected to said valve and float, the housing 26, having two series of ports 30 31 32 and 36 37 38, pipes 33 39, connecting the upper and lower portions of the boiler with ports 30 36, pipes 34 40, connecting ports 31 37 with the compartment 9, the supply-pipe 41, connected to port 38, a compound three-way plug in said housing, a pinion on said plug, a segment-rack engaging said pinion, a lever 21, connected to said rack, a float suspended from said lever 21 in compartment 10, a pipe 63, connecting well 16 with pipe 40, a valve in said pipe, and the stand-pipe 35, connected to pipe 34, as set forth.

11. The combination, with the boiler, of the trap 2, having compartments 9 10, connected by the lower aperture 14, a valve guarding said aperture, a float in compartment 9 for actuating said valve, the barrel 42, connected to the boiler, pipes connecting the upper and lower portions of said barrel with the upper and lower portions of the compartment 9, respectively, a supply-pipe, a compound cock having ports communicating with said pipe and an air-port, a partition isolating said well from said pipes and valve, a drain-pipe provided with a valve leading from said well, and a float in compartment 10 for actuating said compound cock, as set forth.

12. The combination, with the boiler, of the trap 2, having compartments 9 10, connected by the lower aperture 14, a valve guarding said aperture, a float in compartment 9 for actuating said valve, the barrel 42, connected to the boiler, pipes connecting the upper and lower portions of said barrel with the upper and lower portions of the compartment 9, respectively, a supply-pipe, a compound cock having ports communicating with said pipe and an air-port, a partition isolating said well from said pipes and valve, a drain-pipe provided with a valve leading from said well, a float in compartment 10 for actuating said compound cock, and the extension 58, projecting down into said barrel, as set forth.

13. The combination, with the boiler and the trap 2, of the barrel 42, connected to said boiler, a water-supply pipe leading to said trap, the pipe 39, connecting said barrel with the lower part of said trap, the pipe 33, connecting the upper part of said trap with the upper end of said barrel, and the extension 58, extending down into said barrel, substantially as set forth.

CHARLES ALBERT IRVING BABENDREIER.

Witnesses:
HARRY FISHER,
MURRAY HANSON.